Figure 1:
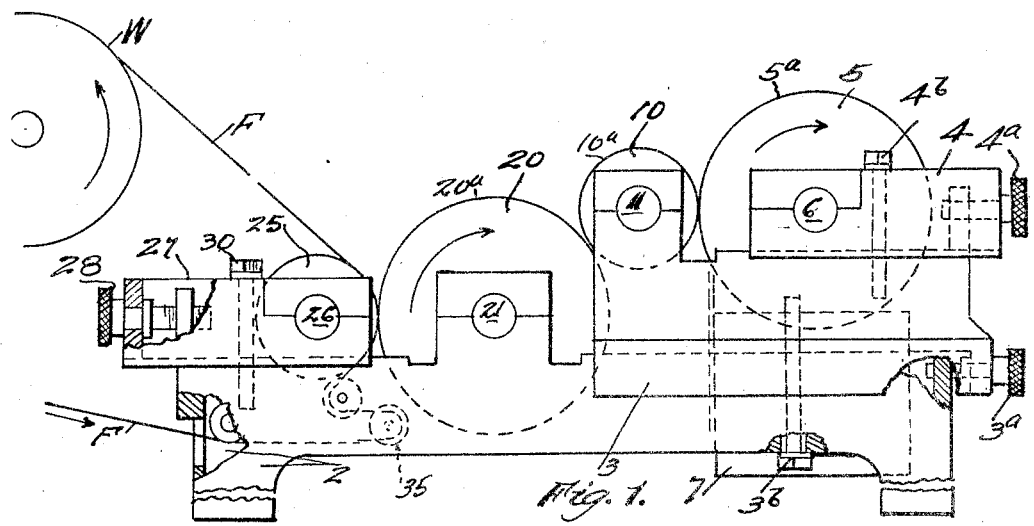

Oct. 25, 1938.   K. R. HOYT   2,134,129
PRINTING APPARATUS
Filed March 6, 1937   2 Sheets-Sheet 1

INVENTOR,
K. R. Hoyt,
By
F. E. Maynard,
his Atty.

Oct. 25, 1938.        K. R. HOYT        2,134,129
PRINTING APPARATUS
Filed March 6, 1937        2 Sheets-Sheet 2
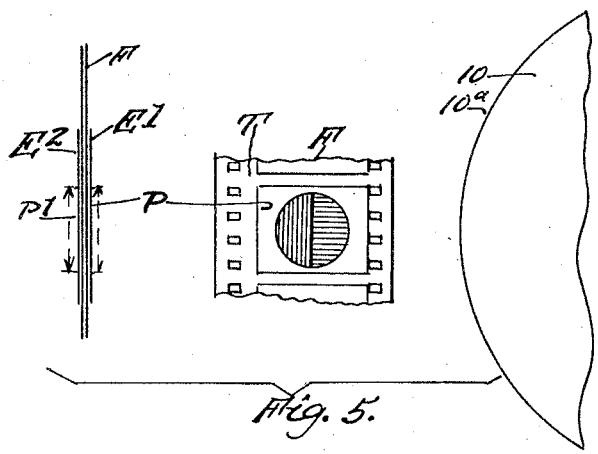
Fig. 5.
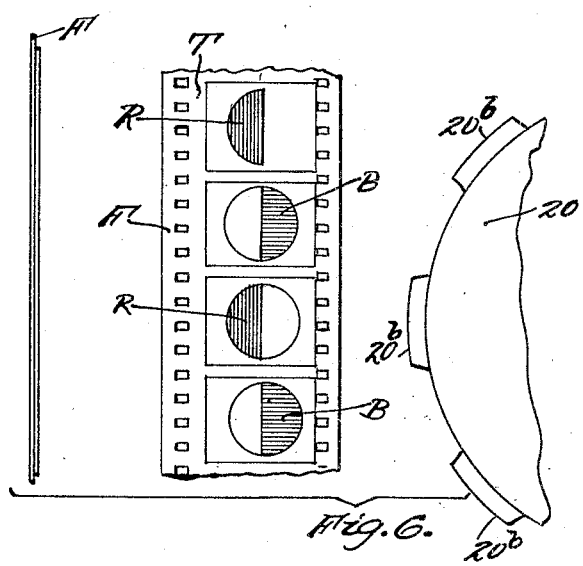
Fig. 6.
Fig. 7.
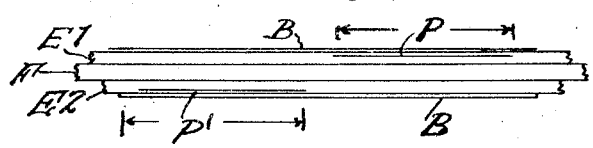
INVENTOR,
K. R. Hoyt;
By F. E. Maynard,
his Atty.

Patented Oct. 25, 1938

2,134,129

UNITED STATES PATENT OFFICE 2,134,129

PRINTING APPARATUS

Karl R. Hoyt, Los Angeles, Calif., assignor to Telco Corporation, a corporation of California Application March 6, 1937, Serial No. 129,526

10 Claims. (Cl. 101—178)

This invention relates to colored, positive, motion picture films, and the invention is a method and apparatus for the making of such positive films, and particularly for the coloration of the "frames" or image zones of the positive strip, and the invention extends to the novel product.

Colored, positive motion picture films are of two general types, one having image emulsion on one side only of the Celluloid strip, and the other having emulsion on both sides or faces. In type one the alternate images are of different colors, and in type two, closely registered, nearly identic images are made opposite each other in the double emulsions, that is, the emulsions on the opposite sides of the film strip, and these are given different color value.

Several methods have heretofore been used to produce the desired color effect in a pair of related film images so that when the film is used for positive projection the related pair will appear as a colored composite on the screen in focus of the projection apparatus, but the old methods are very objectionable because of the great amount of time consumed, because of the complexity of the methods, and the extent of apparatus required in the coloration. The old processes involve the immersion of the film in a fluid bath, or the floating on of the color or other liquid employed, or the use of elaborate imbibing matrices of the particular portions of the images to be colored.

It is the general object of this invention to provide a method and means whereby to greatly reduce the time required by current processes to color the films, and to greatly simplify the apparatus, and reduce the initial plant cost and running expense.

It is an object of this invention to apply a color agent to the naked film surface, or to the emulsion surface, or both, or to employ agents which will chemically alter the emulsion or the film to obtain the desired color, or to utilize both a color agent and a chemical agent on a given film of positive images as may best produce the desired colored projection from the given frames of the picture strip.

Particularly, an object is to provide a bathless, pressureless, continuous-run method for the mechanical transfer of the desired, cohesive liquid or semi-liquid agent, whether a direct color-coat media, or a reacting substance, to the desired surface of the positive strip, either continuously therealong as a layer or to successive or alternate frames.

Another object of the invention is to produce a very thin and uniform body or layer of the desired media and to present this layer closely adjacent to the face of the positive, by means of a vehicle, substantially without contact of the vehicle with the positive and effect a transfer of a uniform coat of the media to the positive.

A further object is to provide for the fine regulation of the layer on the vehicle and the careful adjustment of the film face as to the vehicle to determine the thickness of the layer on the positive, and to preclude injury of the surfaces of the film as may result from undue pressure between the vehicle and the film faces.

An object is to provide for producing a positive picture film of high efficiency in colored picture projection in standard projecting apparatus without the use of color filters as a part thereof.

It is an additional object of the invention to provide for the application of a color or color producing media without injury to the photographic sound record in films having such records.

And it is a special object to eliminate the protective varnishing and varnish removing steps involved in bath methods of coloring films.

The invention consists in certain advancements in this art as set forth in the ensuing disclosure and having, with the above, additional objects and advantages as hereinafter developed, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinbelow.

Figure 2:
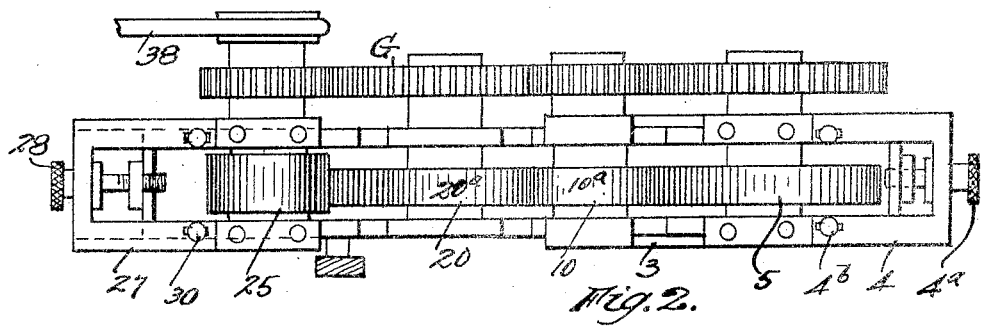
Figures 3, 4:
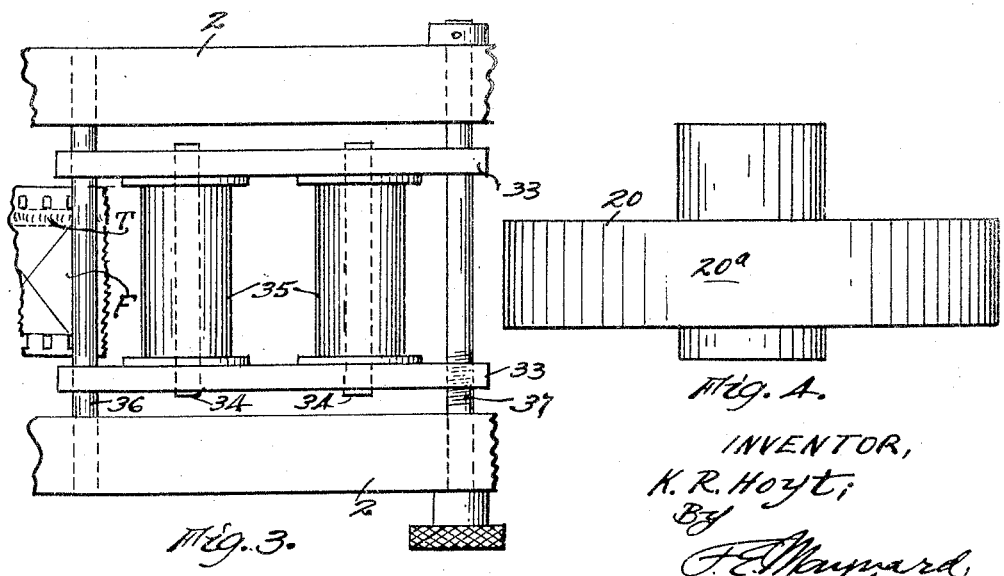

Figure 1 is a sectional side elevation of a form of media, applying machine. Figure 2 is a plan thereof. Figure 3 is a detail plan of a lateral adjuster for the film. Figure 4 is a plan of an intermediate roller of the machine. Figure 5 is a diagram showing a continuous face, intermediate roller and, in edge and face views, a relative double emulsion film to be continuously coated on each face. Figure 6 is a diagram showing an alternate frame, intermediate feeding roller and a relative single emulsion film strip whose alternate frames, in one series, are to receive one color media and the other series another color, in a two-color picture film. Figure 7 is a schematic cross-section, greatly enlarged, of a double emulsion film, color coated on opposed images.

The apparatus includes a suitable frame having spaced walls 2—2 having a top slide 3 longitudinally adjustable by a feed screw 3ª threaded in an end wall of the frame 2 and turnably engaging in a near part of the slide; the latter being secured at desired position by suitable means, as clamp screws 3ᵇ.

On the slide 3 is a carriage 4 turnably engaged by an end screw 4ª threaded in a near part of the slide 3 and operative to shift the carriage in a direction parallel to the movement of the slide by its screw 3ª. Clamp screws 4ᵇ operate to secure the carriage in desired adjustment on the slide 3.

A fountain roller 5 has a shaft 6 journaled in the carriage 4 and is supplied with the appropriate color or other liquid by a suitable means here shown as a fountain 7 from which a controllable layer of the media is imparted to the roller 5. The roller 5 is disposed between side walls of and projects inwardly from the carriage 4, which is substantially U-shaped in plan, the roller 5 preferably being of hard material of acid resistive nature and having a very smooth, cylindrical face 5ª to facilitate the formation of a uniform thickness of media layer.

From the roller 5 the liquid is transferred to a suitable roller 10 preferably having a fine felt or felt-like cylindrical rim and having a shaft 11 parallel to the axis of roller 5 and mounted in the inner end of the slide 3; the fountain roller 5 being adjustable into such proximity to the rim of the roller 10 as to provide for liquid media transfer during rotation of the rollers.

Roller 10 is a means for transferring the liquid media from the roller 5 to an applying cylinder 20 which is non-shiftably supported by its shaft 21 in the frame 2 parallel to the intermediate roller 10; the roller 20 being of hard material and having a very smooth, vehicle forming periphery. By means of the slide 3 the intermediate roller 10 is adjustable into such proximity to the transfer roller 20 as to provide liquid media transfer during operation.

A platen roller 25 of hard material and having a polished cylindrical rim is provided with a shaft 26 parallel to the roller 20 and journaled in a slide or box 27 of U-shape plan and which is turnably engaged by a feed screw 28 threaded in a part of the frame 2 on which the box 27 is slidably adjustable toward or from the transfer roller 20; the box being secured in suitable adjusted position on the frame by clamp screws 30 threaded therein. The platen 25 provides for the desired adjustment of the outer face of the picture film F running thereover in desired contiguity with the vehicle roller 20.

The film F is led to the lower portion of the platen 25 by a positioning device which is carefully, laterally adjustable so as to present the film in predetermined position opposite to the roller 20 which brings the liquid media to the desired transverse area, of the film, to be coated. The positioning device, as here shown, includes a frame having parallel side bars 33 rigidly cross-connected by parallel pins 34 on which are freely turnable a pair of guide spools 35 receiving the film from a suitably located reel (not shown). The frame bars 33 are supported slidably at one end on a cross-piece 36 fixed in the sides of the frame 2 of the machine. The other end of the frame 33 is mounted on a cross-screw 37 turnably supported in the frame 2 and threaded in one of the bars of the frame so that as the screw 37 is rotated the guide spools, which are complementary to the film F being treated and run through the machine, are shifted by their carrying frame (parts 33—34) to the desired transverse position under the platen 25. The guide spools 35 are arranged to form reverse bights in the length of the introduced film F and place it under enough tension as it passes to a winding reel W to cause the film F to lie snug on the platen 25 to facilitate the application to the outer face of the film of a uniform thickness of layer of the liquid media from the vehicle roller 20.

The cylindrical roller and platen parts 5, 10, 20 and 25 are of such diameters as to their liquid carrying or film supporting faces that these may be divided into zones which are an exact multiple of the pitch distance of each picture frame along the film strip being run and treated; of which it is understood that there are various sizes. The pitch of the current 35 mm. film is about .750 of an inch, and the height of an image frame is about .687; that is, its length along the film.

The several rollers 5, 10, 20 and 25 are connected by a gear train G to run smoothly at a common, effective speed of film motion; the platen 25 here being shown connected by a suitable transmission belt 38 to the take-up reel W, of build-up compensating type.

In Figs. 4 and 5 the transfer roller 10 has a continuous, liquid receiving face 10ª by which the liquid media from the fountain roller 5 is passed to the contiguous face 20ª of the applying roller 20. The several liquid layer carrying rollers 5, 10 and 20 are preferably of the same face width and this width is determined by the normal width of the picture frame image of a given positive picture strip to be treated. Such a width, especially of the applying roller 20, precludes detrimental application of the coloring or color-effecting liquid media to the currently used photographic sound record or track T on sound-motion pictures. The adjusting device 33—34 with its spools 35 provides for the careful adjustment of the strip of film transversely to properly register the frame width with the face of the applying roller 20.

The film F of Fig. 5 is of the double emulsion type with emulsion layers E1 and E2 on opposite faces so that the picture frames P—P1 on opposite faces of the film may be positionally registered positives of negatives which have been produced originally through color filters; say the E1 emulsion frames are from red-filter negatives and the E2 frames are from blue filter negatives.

A single emulsion film strip F is shown in Fig. 6 as having alternated, differently color-screened positive frames, R as of red filter negatives, and B as of blue filter negatives. The roller 20, Fig. 6 has its transfer rim divided into faces 20ᵇ whose angular length, in each, is about equal to the height of the frame, on a given film, and these faces are spaced on centers twice the pitch of the successive frames so that the spaced faces 20ᵇ will transfer to the traveling film F, Fig. 1, layers of liquid media spaced to register with the respective alternate frames as R, if red effect is to be applied from the supply source. By a like manner and means the intermediate images or frames B are coated by the desired media to secure the blue projection rays.

A pair of differently colored, similar image frames may be concurrently projected by the use of plural, co-focal lenses in a projector to cast a composite, multi-colored screen picture, or the successive different color images may be projected by the use of a single lens projector in which case the persistence of vision of the observer operates to make a multi-colored image in the eye; and this method of use and projection from the alternate color, single emulsion type film is of advantage since it enables the employment of standard, single-lens projectors.

By running the single emulsion, alternate color frame film F of Fig. 6, through a machine having a duplex set of the color roller trains as just above described the two colors may be applied at the single operation to the respective series of frames, both of the colors drying at the same time; this being a very economical operation.

Fig. 7 shows a double emulsion film F with a "dupe" negative used as a positive (from a lavender positive) in which the red image P is filled with red color media R, and the blue image P' is filled with blue color media B. The layer of color media covering the remainder of the whole frame in each coating case being removed in some manner, as by grinding off, polishing and buffing so as to leave only the relative color area with a color coat.

While the positive images may occupy the full size standard, 35 mm. strip frame area, as here shown and printed from a negative of the same scale, an object of the invention is to provide for the coloration of positive images derived from a related pair of negatives produced in a binocular-lens camera, especially of the type in which the pair of negative images are produced side by side across the normal frame area of a standard size film, as is illustrated in U. S. Patent No. 2,090,398, Aug. 17, 1937. The small negative images are "blown up" in the well known manner to full frame size shown in Figs. 5 and 6, of the instant disclosure, and arranged in direct opposition and register in double emulsion films, Fig. 5, or in direct juxtaposition along the single emulsion film, Fig. 6, in either case the projection of the related images of the binocular pair of positives producing a third dimension or depth screen picture accompanied by color.

Reference herein to liquid and to media is intended to include whatever agent is employed to secure the desired color effect in the finished positive film, whether a color coat direct or a substance acting on the film or the emulsion to provide the desired color effect; agents acting on the emulsion for this result being well known. A suitable color of aniline dye will accomplish the fast drying, color coating function.

The roller 10 may be of other appropriate material than felt, and for frictional efficiency, the roller platen 25 is preferably of hard rubber. Changes may be made in the transmission train G as determined by the nature of the material being applied to the film and by rate of movement of the film.

What is claimed is:

1. A continuous action machine for applying a layer of color-effecting liquid to a face of motion picture film strip, having, in combination, a frame, a platen roller mounted on the frame, means for guiding and transversely adjusting a film to the platen, a rotary vehicle for a layer of the liquid, means including a relatively adjustable supply roller and an intermediate transfer roller adjustable as to and for continually building up a uniform layer of the liquid on the vehicle, and means for relatively adjusting the platen and the vehicle to secure the application of a uniform layer of the liquid to the presented film face and including a slide in which ends of the platen are journaled and which is bodily adjustable on the frame to adjust the platen face as to the rim of the said vehicle.

2. A machine for applying a layer of color-effecting media to a given area of a face of a motion picture film strip having a sound track lane without covering the lane as seen from either side of the film; having in combination, a rotary, film platen of greater width than the film, a rotary vehicle having a circular rim for a layer of the liquid, means for building up a uniform layer of the media on the said rim, means to run the platen and the said rim at a common rate of speed, laterally shiftable, film guiding means for transversely adjusting the film on the platen so that the track lane will be positioned to escape the vehicle layer, and means for relatively adjusting the platen and the vehicle to effect transferring contiguity of the layer and the presented film face said guiding means including a device for bodily moving the film on the platen in either edgewise direction and holding it without side limit by the platen.

3. A machine as set forth in claim 2, and in which the vehicle rim is divided into alined, peripherally spaced, liquid receiving and transferring areas for applying lineally spaced coats of the liquid to alternate picture frames along the strip.

4. A machine for applying to a presented face of a motion picture film strip a layer of color-effecting media, having in combination, a rotary, smoothed rimmed applicator element, an intermediate roller parallelly adjustable with respect thereto as to their peripheral faces for transfer of a layer of the media to said element, a fountain in which there is a supply roller parallelly facially adjustable as to the transfer roller and feeding media thereto, means for concurrently shifting the supply roller and the adjusted transfer roller as to the said element and as to said fountain, a rotary film carrying platen adjustable as to and facially parallel with the said element, and means for rotating said platen and said element at a common speed while the film is presented in contacting relation to said layer on the applicator element.

5. A machine as set forth in claim 4, and said shifting means including a slide mounted on the fountain and journaling the intermediate roller and having an adjustable slide journaling the supply roller to shift both as to the applicator.

6. A machine as set forth in claim 4, the applicator device having an effective rim face whose width is about equal to the normal width of the picture image of a film frame excluding the possible sound track width along the film the platen, the applicator, the intermediate and supply rollers being peripherally in train on the longitudinal axis of the film, and means for transversely adjusting the film as to the applicator and including a rotary device engaging the sides of the film and moving it sidewise in either direction and confining it to the adjusted position.

7. A machine for applying a color-effecting media layer to presented face of a motion picture film, having, in combination, a film supporting platen, an applicator roller in parallel, peripherally adjustable relation therewith and operating at the speed of the film on the platen for applying to the film a layer of the media; the applying face of the roller being of about the same width as the width of the film picture frame and laterally adjustable guide means laterally holding and transversely adjusting the film passing between the platen and the roller and including bodily, axially shiftable rotary elements bodily shifting the film in either direction as to the roller and so confining it.

8. A machine as set forth in claim 7, and the said roller having transfer faces of picture frame size spaced apart to correspond with the spacing of alternate picture frames along the film strip.

9. A machine of the class set forth and having an applicator roller, a film supporting platen of greater width than the film and means for shifting it to bring the film thereon into contiguity with the rim of the applicator, means for guiding the film to and transversely shifting it in either direction and so holding it on the face of the platen, a transfer roller and means for adjusting it as to the rim of the applicator, and a supply roller for taking a liquid media from a source of supply and imparting it to the transfer roller and having means for regulating the imparting contiguity.

10. A machine as in claim 9, and in which the guide means includes a roller having end flanges spaced a distance about equal to the film width and being bodily adjustable endwise, and being parallel and adjacent to the platen face.

KARL R. HOYT.